United States Patent [19]

Humer

[11] Patent Number: 4,844,542
[45] Date of Patent: Jul. 4, 1989

[54] EASY ENTRY SEAT ADJUSTER WITH MEMORY

[75] Inventor: Mladen Humer, East Detroit, Mich.

[73] Assignee: General Motors Corporation, Detroit, Mich.

[21] Appl. No.: 237,479

[22] Filed: Aug. 29, 1988

[51] Int. Cl.$^4$ .............................................. B60N 1/04
[52] U.S. Cl. ................................... 297/341; 248/430; 297/379
[58] Field of Search ............... 297/341, 344, 354, 378, 297/379; 248/419, 420, 424, 429, 430, 393, 398; 296/65 R

[56] References Cited

U.S. PATENT DOCUMENTS

| | | | |
|---|---|---|---|
| 3,940,182 | 2/1976 | Tamura | 297/341 |
| 4,065,178 | 12/1977 | Carella et al. | 297/341 |
| 4,101,169 | 7/1978 | Muraishi et al. | 297/341 |
| 4,159,147 | 6/1979 | Kiyomitsu et al. | 297/341 |
| 4,422,690 | 12/1983 | Kopich | 297/341 |

*Primary Examiner*—Peter R. Brown
*Attorney, Agent, or Firm*—William A. Schuetz

[57] ABSTRACT

An easy entry seat adjuster mechanism for a seat assembly having a seat cushion unit and a pivotal back rest and which functions to allow the seat cushion unit to be adjustably positioned along a track and which functions to allow the seat to be shifted forwardly in response to tilting movement of the seat back to permit easy entry into the rear seat and then to automatically return the seat to its previously adjusted position upon return of the back rest to its upright position and shifting the seat rearwardly. The seat adjuster mechanism has a memory means, including a stationary rack and toothed gear operatively associated with a lock lever on the seat adjuster for effecting the automatic repositioning of the seat to its previously adjusted position.

2 Claims, 5 Drawing Sheets

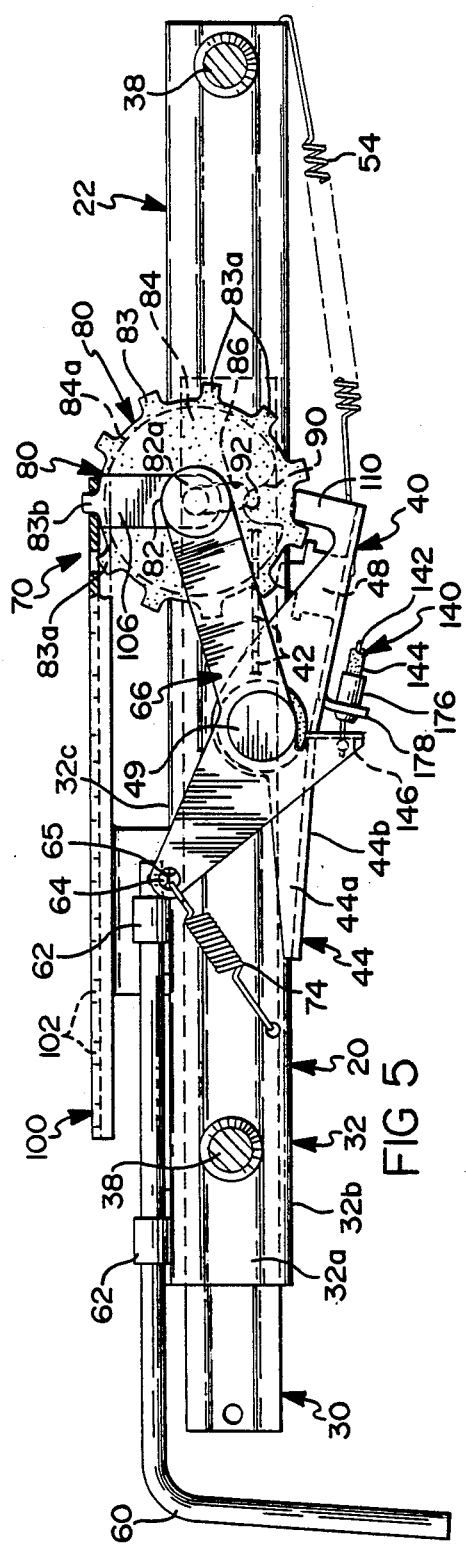
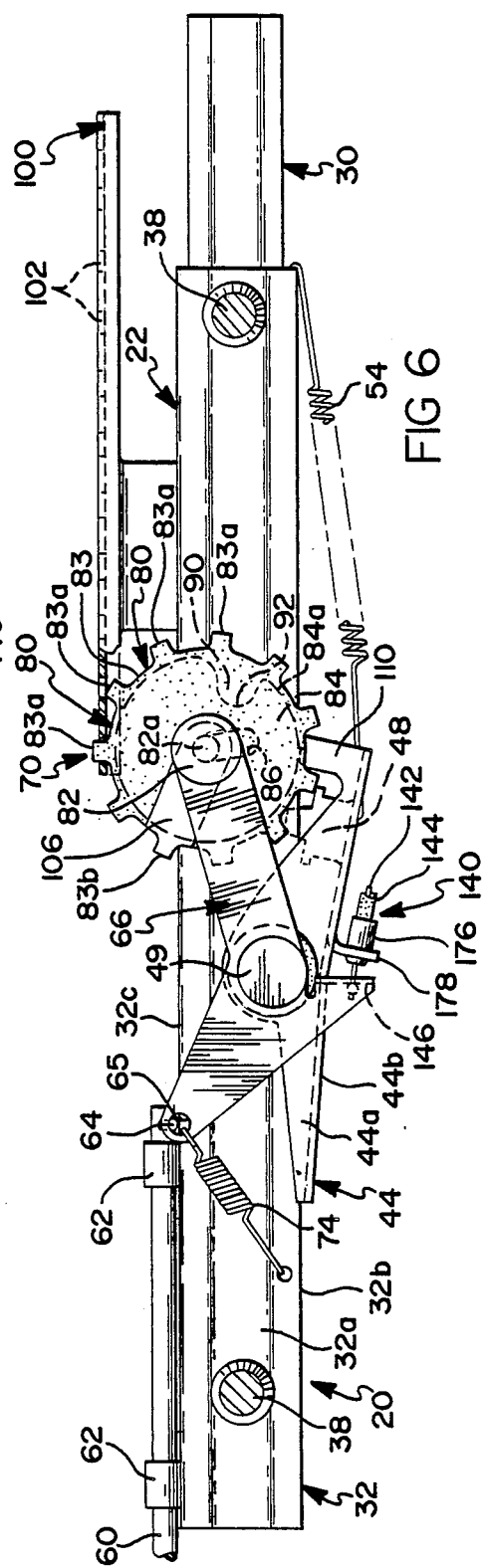
FIG 5
FIG 6

EASY ENTRY SEAT ADJUSTER WITH MEMORY

The present invention relates to a vehicle seat or seat assembly and, more particularly, to a vehicle seat which is bodily shifted forwardly in response to tilting its seat back forward to permit ease of entry into the vehicle and which has a memory so that the seat is automatically returned to its previous position when the seat back is tilted to its upright position and moved rearwardly.

It is known to mount vehicle front seats on tracks to permit fore and aft adjustment of the seat to suit the driver. It is also known to pivot the seat back to the seat cushion to permit forward tilting of the seat back to facilitate entering and leaving a rear seat of a two door type vehicle. It is further known to provide a vehicle seat construction in which forward tilting movement of the seat back automatically causes forward bodily movement of the vehicle seat on a horizontal adjuster track to provide increased access opening to the rear seat. It is additionally known to provide a memory means in the last mentioned type of seat construction so that the seat will always be returned to its previous adjusted position.

The present invention provides a new and improved easy entry seat or seat assembly of the last mentioned type, but which is provided with a memory means which is of a simple, compact, economical construction, can largely be made from stamped sheet metal parts, and which is readily adapted for use with a variety of seat adjuster track assemblies.

Accordingly, it is an important object of the present invention to provide a new and improved easy entry vehicle seat or seat assembly which can be bodily shifted forwardly in response to forward tilting of a seat back and which includes a memory means for automatically returning the seat to its previous position when the seat back is tilted upright and shifted rearwardly, and in which the memory means is of a relatively simple, compact and economical construction.

Another object of the present invention is to provide a new and improved easy entry vehicle seat assembly which comprises a stationary guide track which is adapted to be mounted to the vehicle floor, a second movable guide track which is slidably mounted on the stationary guide track for movement between forward and rearward positions, a seat cushion unit mounted to the second guide track, a seat back pivotally supported on the seat cushion for movement between an upright position and a forward position overlying the seat cushion unit to permit easy entry into the vehicle, a latch means including a lock lever pivotally supported by the second guide track for movement between a locked position in which the lock lever locks the movable guide track to the stationary guide track and an unlocked position in which the lock lever is disengaged from the stationary guide track to enable the movable guide track and seat cushion unit to be slidably moved fore and aft of the stationary track to adjust the position of the seat cushion unit, a first spring means for biasing the lock lever towards its locked position, and a first release means or handle operatively connected with the latch means for effecting movement of the lock lever to its unlocked position to enable said seat cushion unit to be slidably moved, and a second release means operatively connected to the lock lever and responsive to movement of the seat back towards it forward position to move the lock lever to its unlocked position to allow forward shifting movement of the seat cushion unit to provide easy entry behind the seat into the vehicle, and a seat position memory means including a stationary rack extending alongside the movable track and a toothed gear means which is swingably supported by the second or movable track means, biased toward meshed engagement with the rack, operatively engageable with the lock lever and operatively connected with the first release means, and in which the seat position memory means functions to allow the seat to be bodily shifted forwardly in response to tilting movement of the seat back to permit easy entry into the rear of the vehicle and also functions to automatically reposition the vehicle seat in its previous position in response to tilting the seat back to its upright position and shifting it rearwardly.

A further object of the present invention is to provide a new and improved easy entry vehicle seat assembly, as defined in the next preceding object, and in which the toothed gear means is swingable out of engagement with the rack and effects movement of the lock lever to its unlocked position to allow the seat cushion to be moved to an adjusted position in response to actuation of the first release means or handle, and in which the toothed gear means is rotatable relative to the lock lever and remains in meshed engagement with the rack when the lock lever is moved to its unlocked position and out of locking engagement with the toothed gear means in response to movement of the back rest toward its forward tilted position to allow said seat to be moved forwardly for easy entry, the lock lever automatically returning towards its locked position and into locked engagement with the toothed gear means when the back rest is moved to its upright position and moved rearwardly whereby the seat assembly is always returned to its previous adjusted position.

A further object of the present invention is to provide a new and improved easy entry vehicle seat assembly, as defined in the next preceding object, and in which the memory means includes a second lever pivotally supported on the movable track and the toothed gear means is rotatably supported by the second lever, the gear means including an annular cam portion on its underside except for a radially extending notch whose depth is defined by a bottom and with the toothed gear means being located adjacent a lock tab on the lock lever which is receivable within the notch, and in which the second lever and gear means are swingable as a unit between a first position in which the toothed portion of the gear means is in meshed engagement with the rack and a second position in which it is disengaged from the rack and has engaged the tab on the lock lever to move the lock lever to its unlocked position, a second spring means operatively connected with the second lever for biasing the second lever and the gear means toward their first position, and wherein the first release means or handle causes the second lever and gear means to be moved conjointly in opposition to the biasing force of the second spring means to their second position and the lock lever to its unlocked position to allow the seat cushion unit to be adjustably positioned fore and aft, and in which the back rest when moved to its forward tilted position causes the lock lever to be moved to its unlocked position in which the tab thereof is located radially outwardly of the notch in the cam portion of the toothed gear to allow the gear means to remain in meshed engagement with the rack and rotate and move along the rack when the seat assembly is pushed forward from its adjusted position, and in which the back rest when moved toward its upright position causes the first spring means to move the tab on the lock lever into engagement with the annular cam portion of the gear means and when moved rearwardly causes the gear means to rotate and move along the rack with the tab riding on the cam portion until the notch is in radial alignment therewith whereupon the first spring means moves the lock lever towards its locked position and with the tab being received within the notch to prevent further rearward movement of the seat cushion unit whereby the latter is automatically returned to its previous adjusted position.

The present invention further resides in various novel constructions and arrangement of parts, and further objects, novel characteristics and advantages of the present invention will be apparent to those skilled in the art to which it relates and from the following detailed description of the illustrated, preferred embodiment thereof made with reference to the accompanying drawings forming a part of this specification and in which similar reference numerals are employed to designate corresponding parts throughout the several views, and in which:

FIG. 3 is a top plan view of part of the easy entry vehicle seat assembly of the present invention and looking in the direction of the arrow 3—3 of FIG. 1;

FIG. 4 is a view like that shown in FIG. 3, but showing different parts thereof in different positions;

FIG. 5 is a view like that shown in FIG. 3, but showing different parts thereof in different positions;

FIG. 6 is a view like that shown in FIG. 3, but shown different parts thereof in different positions;

Figure 1:
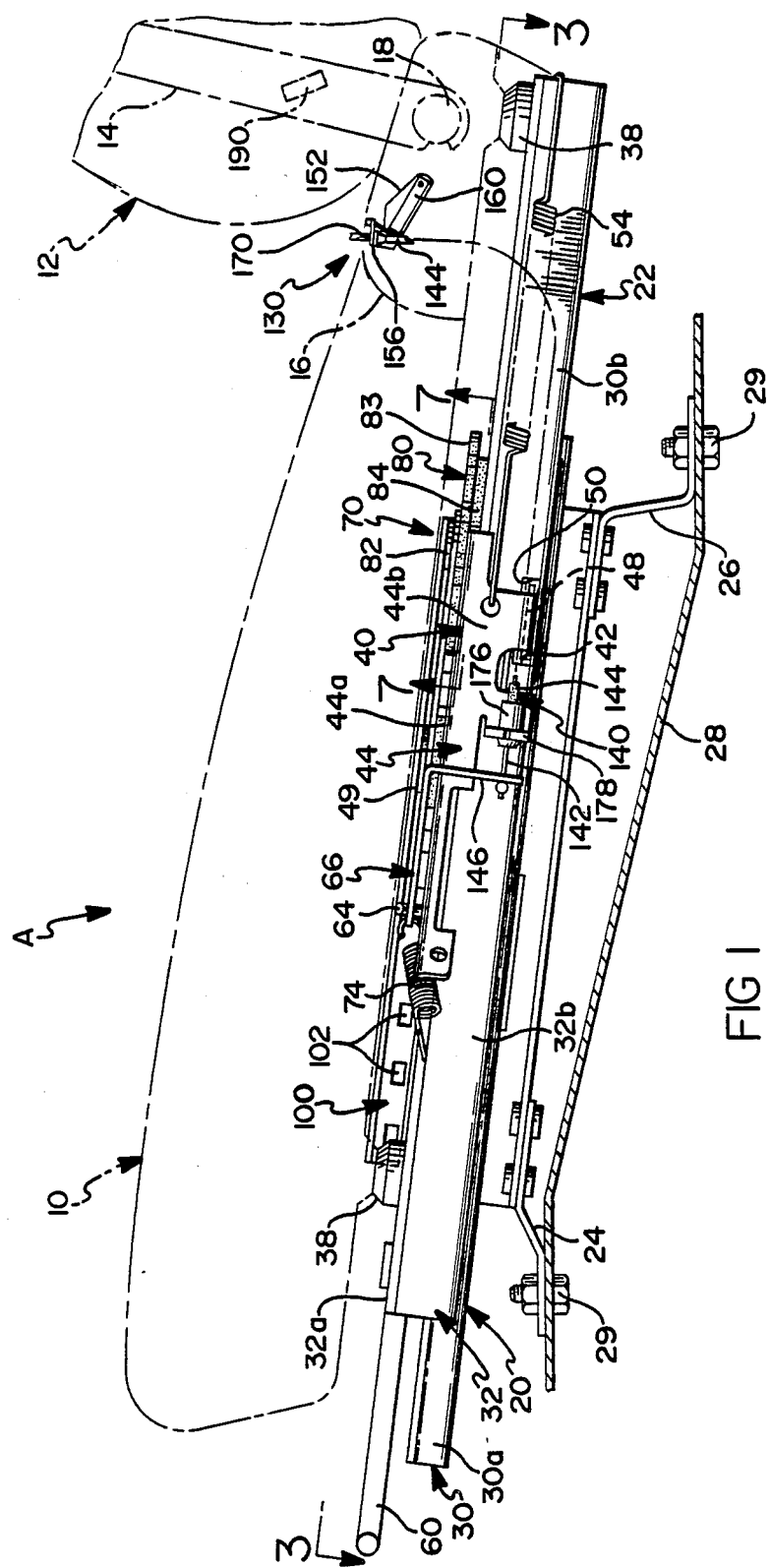
FIG. 1 is a side elevational view of an easy entry vehicle seat assembly of the present invention and in which the seat cushion and back rest are shown in phantom.
Figure 2:
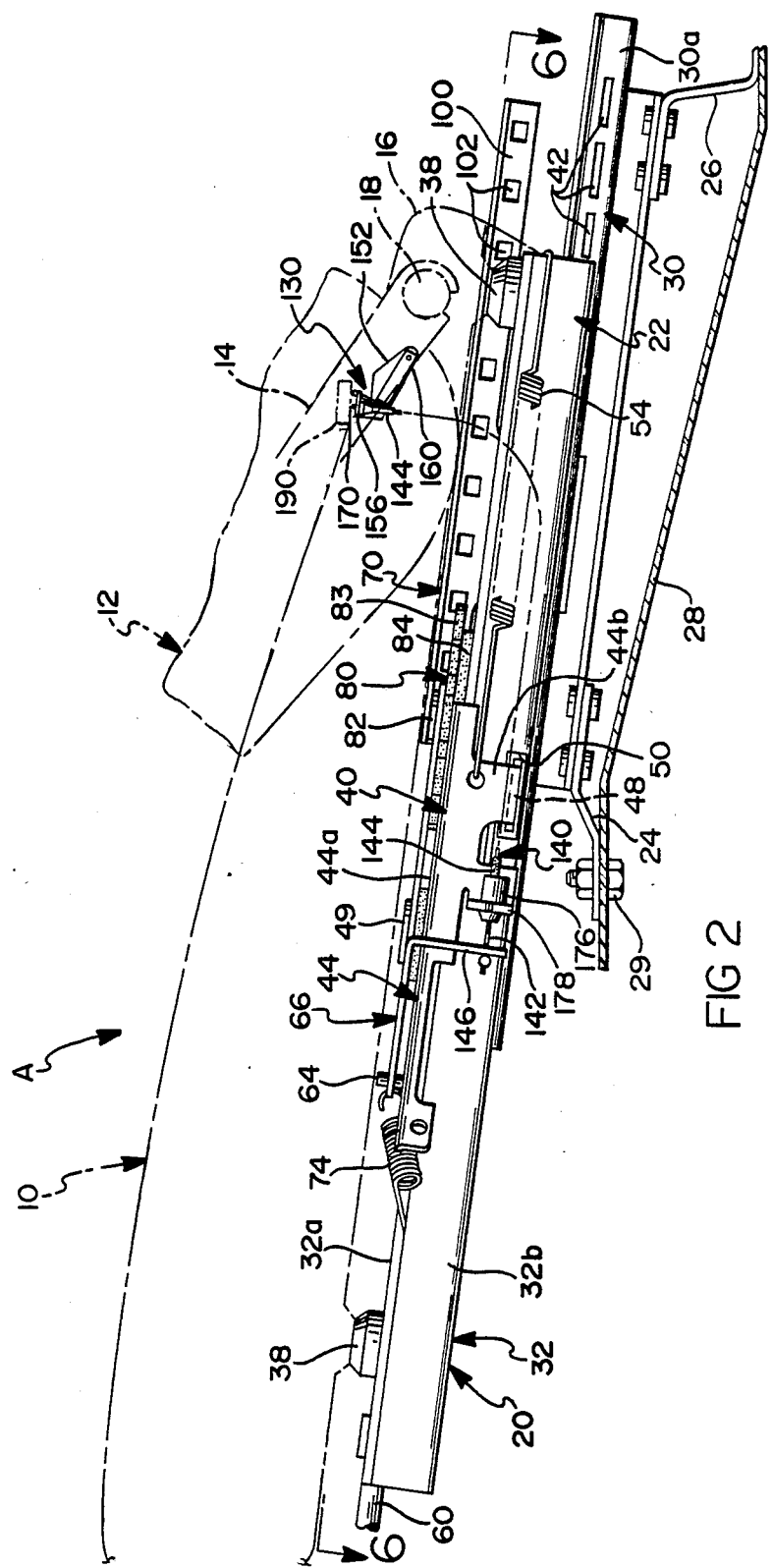
FIG. 2 is a view like that shown in FIG. 1, but showing different parts thereof in different positions.
Figure 7:
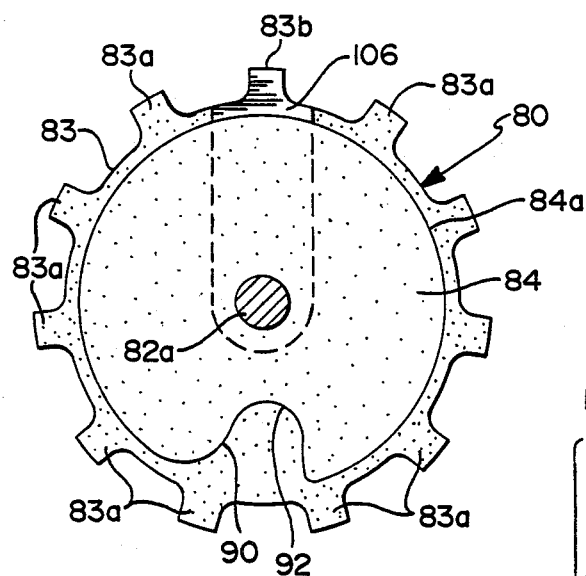
FIG. 7 is an enlarged fragmentary sectional view of part of the vehicle seat assembly shown in FIG. 1 and looking in the direction of the arrow 7—7 of FIG. 1.

The present invention provides a novel easy entry vehicle seat or seat assembly A. The seat assembly A comprises a seat cushion unit 10, a seat back or back rest unit 12 having a pair of side arms 14 (only one of which is shown) which are pivotally connected to supports 16 on the seat cushion unit 10 by a pair of pivots 18 for movement between a normal upright position, as shown in FIG. 1, and a forward tilted or folded position, as shown in FIG. 2, in which the seat back 12 overlies the seat cushion unit 10, and a seat adjuster mechanism 20 for supporting the seat cushion unit and the seat back 12. The seat cushion unit 10 and the seat back 12 could be of any suitable or conventional construction and therefore, except as hereinafter noted, will not be further described.

Figure 8:
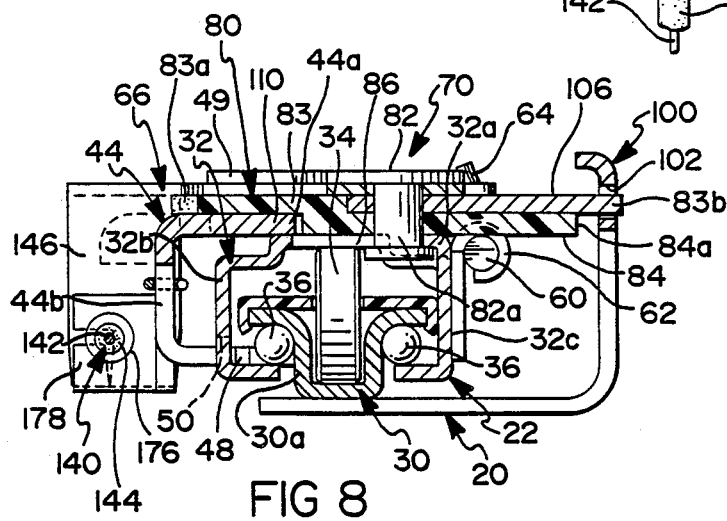
FIG. 8 is an enlarged cross-sectional view looking in the direction of the arrows 8—8 of FIG. 3.

The seat adjuster mechanism 20 comprises a track assembly 22 located underneath but adjacent to each side of the seat cushion unit 10 (only one of which is shown in the drawings). The track assembly 22 is supported adjacent its forward and rearward ends by support brackets 24 and 26 having one end suitably riveted or secured to the track assembly 22 and its other end bolted to a vehicle floor 28 by bolts 29. The track assembly 22 could be of any suitable or conventional construction and is hereshown as comprising a stationary track 30 which is generally U-shaped (see FIG. 8) and which is suitably riveted or secured to the support brackets 24 and 26. The track assembly 22 further includes a movable track 32 which is of a generally inverted U-shape and which is rollably supported on the stationary track 30 via rollers 34 and ball bearings 36 located between adjacent flanges of the U-shaped tracks 30 and 32 at the free ends of their respective sides. The movable track 32 supports the remainder of the seat cushion unit 10 via connectors 38 secured to the top side of the bottom of the track 32 and the seat cushion unit 10.

The movable track 32 is thus rollably supported for movement forwardly and rearwardly of the stationary track 30 to enable the seat cushion unit 10 to be moved forwardly and rearwardly to adjust the position of the seat assembly A for a driver's convenience. The seat adjuster mechanism 20 also includes a latch means 40 for locking the seat cushion unit 10 in one of a plurality of adjusted positions. The latch means 40 comprises a plurality of longitudinally spaced notches 42 located in one side 30a of the stationary track 30 and a latch lever or lock lever 44. The lock lever 44 is of a generally inverted L-shaped configuration and is made from stamped sheet steel. The lock lever 44 has a horizontally disposed portion 44a which overlies the top surface 32a of the movable channel 32 and is pivotally connected thereto via a pivot means 49. The lock lever 44 has its other leg 44b located adjacent one side 32b of the channel 32. The lock lever 44 also has a locking tab or projection 48 which is integral with the side 44b of the lock lever 44 and which extends normal thereto. The tab 48 extends through a notch or opening 50 in the side 32b of the guide track 32 and which is received in one of the plurality of notches 42 in the stationary track 30.

Figures 3, 4:
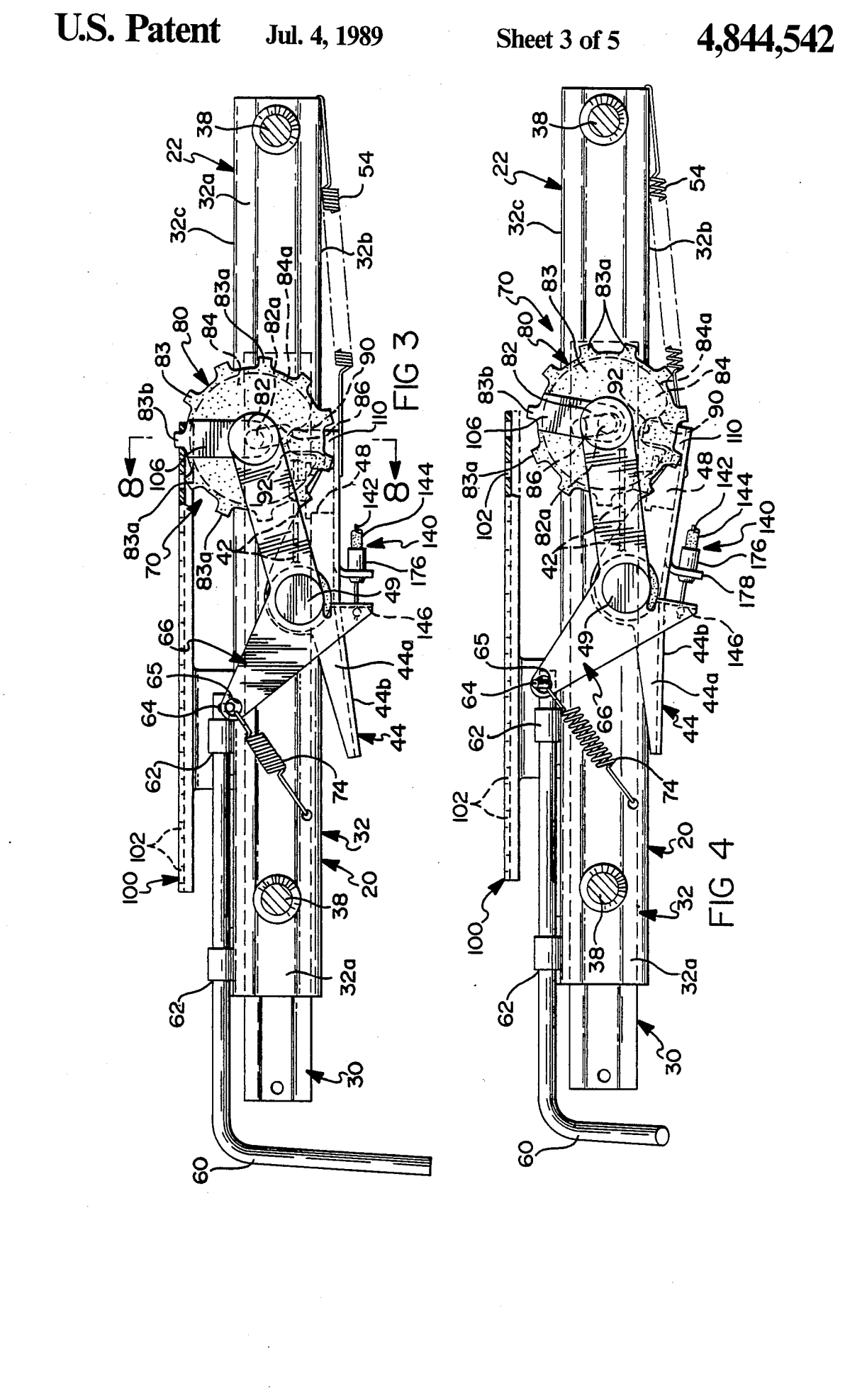

The lock lever 44 is pivotally supported by a pivot means 49 for movement between a locked position, as shown in FIGS. 1 and 3, in which the tab 48 is received in a notch 42 in the stationary track 30 to lock the movable track 32 in place and prevent movement thereof along the stationary track 30, and an unlocked position, as shown in FIGS. 4 through 6, in which the tab 48 thereof is not located in one of the notches 42 so as to enable the movable track 32 to be rolled along the stationary track 30.

The lock lever 44 is biased toward its locked position in which the tab 48 is received within a notch 42 in the stationary track 30 via by a tension spring means 54. The tension spring 54 has one end connected to the right end of the lock bar, as viewed in FIG. 3, and its other end connected to the movable track 32. The tension spring 54 functions to rotate the lock lever 44 in a counterclockwise direction, as viewed in FIGS. 3 through 6, and hence the tab 48 inwardly towards engagement with the stationary track 30.

The lock lever 44 can be moved from its locked position, as shown in FIG. 3, towards its unlocked position, as shown in FIG. 4, via by a manually manipulable release handle 60 or can be moved to its unlocked position in response to forward tilting movement of the seat back 12. The manually manipulable release handle 60 is generally L-shaped and is suitably pivotally secured to the other side 32c of the movable channel 32 by pivot means 62. The release handle 60 at its end adjacent the lock lever 44 is rigidly secured to a transversely extending pin 64. The pin 64 adjacent its other end extends through an aperture 65 in a second lever 66 which comprises part of a memory means or mechanism 70. The second lever 66 is disposed above the horizontal leg 44a of the lock lever 44 and is pivotally connected to the movable guide track 32 by the same pivot means 49 which pivotally connects the lock lever 44 thereto. The lever 66 at its left end, as viewed in FIG. 3, is connected to the pin 64 and is also connected to one end of a second tension spring 74. The tension spring 74 at its other end is suitably connected to the movable guide track 32. The tension spring 74 functions to bias the second lever 66 in a counterclockwise direction.

The lever 66 adjacent its right end, as viewed in FIG. 3, is pivotally connected to a gear means 80 of the memory means 70 via a pivot pin means 82. The pivot pin means 82 includes a shaft portion 82a which extends beneath the gear means 80 and is received within an arcuate slot 86 formed in the top side 32a of the movable track 32 to enable the gear means to be moved transversely of the guide track 32. The gear means 80 is circular in shape and includes a toothed portion 83 and a cam portion 84 located beneath the toothed portion 83. The toothed portion 83 includes a plurality of circumferentially spaced teeth 83a and the cam portion 84 is also circular in shape to define a circumferentially extending cam surface 84a which is continuous except for a radially extending notch 90 having a bottom surface 92. The cam portion 84 is located adjacent the top surface 32a of the movable channel 32.

The toothed portion 83 of the memory means 70 is adapted to be in meshed engagement with a stationary rack 100 having a plurality of longitudinally spaced notches 102 therein. The rack can be suitably secured to the stationary channel 30 and be positioned so that its rack portion is located alongside the movable channel 32.

As best shown in FIGS. 3 through 6, the gear means 80 could be made from a suitable or conventional plastic material and be provided with a metal insert 106 secured thereto which defines a metal tooth 83b at its outer end. The metal tooth 83b provides greater strength than the plastic teeth 83a and, as will become apparent hereinafter, it is the tooth that will always be in engagement with the rack 102 when the seat assembly A is in its adjusted position. Alternately the gear means 80 could be made entirely of metal and be made via a fine blanking operation for increased strength.

The notch 90 on the gear means 80 is adapted to receive a second transversely extending tab 110 formed integral with the lock lever 44. The tab 110 is coplanar with the horizontal leg 44a thereof and is slidably received within the notch 90.

The operation of the seat adjuster mechanism 20 will now be described. If the driver of the vehicle desires to adjust the position of the seat assembly A on the stationary track 30, he need merely pull up on the handle 60. That is, by grasping the handle 60 when in the position shown in FIG. 3, and moving the same upwardly toward a position shown in FIG. 4, will cause the handle 60 to be rotated, which in turn will cause the pin 64 to be rotated to effect rotation of the second lever 66 in a clockwise direction and in opposition to the biasing force of the tension spring 74. When the lever 66 is rotated in the clockwise direction, it will move the gear means 80 out of engagement with the rack 100, as shown in FIG. 4. This movement also causes the lock lever 44 to be rotated in a clockwise direction to release the locking tab 48 from its associated notch 42 in the stationary track 30. This movement of the lock lever 44 takes places as a result of the engagement between the bottom 92 at the notch 90 of the gear wheel 83 engaging the tab 110 on the lock lever 44.

When the lock lever 44 has been moved to its unlocked position, as shown in FIG. 4, the driver can then move the seat cushion unit 10 fore and aft as a result of the rolling engagement between the movable guide track 32 along the stationary track 30. When the operator has reached the desired fore and aft adjusted position of the seat, he need merely release the handle 60. Release of the handle 60 causes the tension spring 74 to move the second lever 66 in a counterclockwise direction. Movement of the lever 66 in a counterclockwise direction causes the gear means to again be moved toward its FIG. 3 position in which the tooth 83b is again disposed in a notch 102 in the rack 100 so as to be in meshed engagement therewith. Movement of the lever 66 in a counterclockwise direction also allows the lock lever 44 to be moved in a counterclockwise direction due to the biasing force of the tension spring 54. Movement of the lock lever 44 in this direction causes the tab 48 to be received in the adjacent notch 42 in the stationary track 30 to again lock the movable track 32 in place relative to the stationary track 30.

Figure 9:
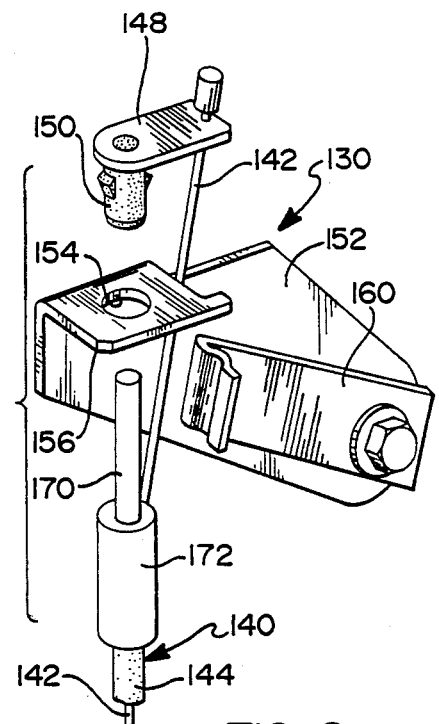
FIG. 9 is an exploded view of part of the novel seat assembly of the present invention.

Movement of the seat cushion unit 10 forwardly along the stationary track 30 can also take place in response to forward tilting movement of the seat back 12. To this end, a second release means 130 (see FIGS. 1 and 9) operatively connected with the lock bar 44 and the seat back 12 and seat cushion unit 10 is provided. The second release means 130 comprises a cable means 140 having an inner metal cable 142 and an outer sheath 144. The inner cable 142 has one end connected to a tab or ear 146 on the second lever 66 and, as best shown in FIGS. 1 and 9, its other end connected to a small plate 148 for holding a bushing means 150. The plate 148 is adapted to overlie a bracket 152 which is suitably mounted on the support 16 of the seat cushion unit 10. The plate 148 is secured to the bracket 152 by force fitting the bushing 150 through an aperture 154 on an ear 156 of the bracket 152. When the bushing 150 is force fitted through the opening 154 of the bracket ear 156, a cable position retainer 160 bolted to the bracket 152 can be employed to guidably hold or retain the cable 142 in position. The bushing 150 is adapted to slidably receive a plunger 170 which extends therethrough and above the plate 148. The plunger 170 includes an enlarged diameter or ferrule 172 which is in abutting engagement with the end of the outer cable sheath 144. The other end of the cable sheath 144 is in abutting engagement within a bushing 176 secured to an ear 178 on the lock lever 44. Pushing downwardly on the plunger 170 causes the sheath 144 to push against the bushing 176 and ear 178 on the lock lever 44 to cause the latter to be rotated in a clockwise direction so as to move the tab 110 out of engagement with the notch 90 in the cam 84 of the gear means 80 and to move the tab 48 out of engagement with the associated notch 42 in the stationary track 30.

The operation of the automatic shifting of the seat assembly 84 forwardly in response to tilting movement of the seat back 12 will now be described. When the seat back 12 is tilted forwardly, a tab 190 on its arm 14 will be rotated and then engage the top of the plunger 170. When the plunger 170 is depressed, the outer sheath 144 of the cable is caused to be moved toward the left, as viewed in FIGS. 3 and 5. This movement in turn causes the lock lever 44 to be pivoted in a clockwise direction to move the tab 110 out of the notch 90 and to move the tab 48 out of engagement with its notch 42 in the stationary track 30. When this occurs, the seat A can be merely rolled forwardly to permit easy entry into the back seat area. When the lock lever 44 is in the position shown in FIG. 5, and the seat is being moved forwardly, the toothed portion of the gear means 80 will rotate and move along the rack 100 while remaining in meshed engagement therewith. This movement can be seen from the different positions shown in FIGS. 5 and 6.

When the seat back 12 is moved towards its upright position, the tension spring 54 will tend to return the lock lever 44 towards its locked position. However, this cannot occur since the tab 110 will be engaged with the annular cam surface 84a of the cam portion 84, as shown in FIG. 6. The tab 110 will ride on the cam surface 84a as the seat unit A is being returned towards its rearward position and with the gear rotating in a reverse direction along the rack 100. As the seat is moved rearwardly and approaches its previous position, the notch 90 will be radially aligned with the tab 110 whereupon the tension of the spring 54 will cause the lock lever 44 to be rotated in a counterclockwise direction and with the tab 110 being received within the notch and the tab 48 being received within the notch 42 in the stationary track 30 to again lock the seat unit 10 in place in its previous adjusted position.

It will thus be seen that the memory means 70 which comprises the rack 100, the gear means 80 and the lever 66 will always cause the seat A to be repositioned in its previous position and that it is failsafe. It should also be apparent that the memory means 70 is of a very simple and economical construction, very compact and can be largely made from sheet metal parts with the possible exception of gear means 80.

Although the illustrated embodiment thereof has been described in great detail, it should be apparent that certain modifications, changes and adaptations may be made in the illustrated embodiment, and that it is intended to cover all such modifications, changes and adaptations which come within the spirit of the present invention.

The embodiments of the invention in which an exclusive property or privilege is claimed are defined as follows:

1. An easy entry vehicle seat assembly comprising a stationary guide track means which is adapted to be mounted to a vehicle floor, a second guide track means which is slidably mounted on said stationary guide track means for movement between forward and rearward positions, a seat cushion unit mounted to said second guide track means, a back rest unit pivotally supported on said seat cushion unit for movement between an upright position and a forward position overlying said seat cushion unit to permit easy entry into the vehicle, a latch means including a lock lever pivotally supported by said second guide track means for movement between a locked position in which said lock lever is engageable with means on said stationary track to lock the second guide track means and said seat cushion unit to said stationary track means and an unlocked position in which said lock lever is disengaged from said stationary track means to enable said second track means and said seat cushion unit to be slidably moved fore and aft on said stationary track to adjust the position of said seat cushion unit and first spring means for biasing said lock lever to its locked position, first release means operatively connected with said latch means for effecting movement of said lock lever to its unlocked position in opposition to the biasing force of said first spring means to enable said second track means of said seat cushion unit to be slidably moved on said stationary track, second release means operatively connected to said lock lever of said latch means and responsive to movement of said back rest unit toward its forward position to move said lock lever to its unlocked position to allow forward movement of said seat cushion unit to provide easy entry behind the seat to said vehicle, and seat position memory means including a stationary rack extending along said second track means and a toothed gear means which is swingably supported by said second track means, biased toward meshed engagement with said rack, operatively engageable with said lock lever of said latch means and operatively connected with said first release means, said toothed gear means being swingable out of engagement with rack and effecting movement of said lock lever to its unlocked position to allow said seat cushion unit to be moved to an adjusted position in response to actuation of said first release means, said toothed gear means being rotatable relative to said lock lever and remaining in meshed engagement with said rack when said lock lever is moved to its unlocked position and out of locking engagement with said toothed gear means in response to movement of said back rest to its forward position to allow said seat to be moved forwardly for easy entry, said lock lever automatically returning toward its locked position and into locked engagement with said toothed gear means when said back rest is moved to its upright position whereby said seat assembly is always returned to its adjusted position.

2. An easy entry vehicle seat assembly comprising a stationary guide track means which is adapted to be mounted to a vehicle floor, a second guide track means which is slidably mounted on said stationary guide track means for movement between forward and rearward positions, a seat cushion unit mounted to said second guide track means, a back rest unit pivotally supported on said seat cushion unit for movement between an upright position and a forward position overlying said seat cushion unit to permit easy entry into the vehicle, a latch means including a lock lever pivotally supported by said second guide track means for movement between a locked position in which said lock lever is engageable with means on said stationary track to lock the second guide track means and said seat cushion unit to said stationary track means and an unlocked position in which said lock lever is disengaged from said stationary track means to enable said second track means and said seat cushion unit to be slidably moved fore and aft on said stationary track to adjust the position of said seat cushion unit, first spring means for biasing said lock lever to its locked position, first release means operatively connected with said latch means for effecting movement of said lock lever to its unlocked position in opposition to the biasing force and said first spring means to enable said second track means of said seat cushion unit to be slidably moved on said stationary track, second release means operatively connected to said lock lever of said latch means and responsive to movement of said back rest unit toward its forward position to move said lock lever to its unlocked position to allow forward movement of said seat cushion unit to provide easy entry behind the seat to said vehicle, and seat position memory means operatively connected with said first release means and operatively engageable with said lock lever of said latch means for allowing said seat cushion unit and second track means to be adjustably positioned along said stationary track in response to manual manipulation of said first release means and for allowing said seat cushion unit and second track means to be moved forwardly of their adjusted position in response to movement of said back rest unit to its forward position and then automatically returned to their adjusted position in response to movement of said back rest unit to its upright position, said memory means comprising a stationary rack extending along said second track means, a second lever pivotally supported by said second track means, a gear means rotatably supported by said lever, said gear means having a toothed portion and a generally annular cam portion having a single radially extending notch whose depth is defined by a bottom, said gear means being located adjacent a lock tab on said lock lever of said latch means which is receivable in said notch, said second lever and gear means being swingable between a first position in which said toothed portion of said gear means is in meshed engagement with said rack and a second position in which the toothed portion is not in meshed engagement with said rack and in which the bottom defining said notch has engaged said tab and moved said lock lever to is unlocked position, second spring means operatively connected with said second lever for biasing the second lever and said gear means toward their first position, said first release means being operatively connected with said second lever, said first release means in response to being manually manipulated causing said second lever and gear means to be moved in opposition to the biasing force of said second spring means to their second position and said lock lever to its unlocked position to allow said seat cushion unit to be adjustably positioned fore and aft, said back rest unit when moved to its forward position causing said lock lever to be moved to its unlocked position in which said tab thereof is located radially outwardly of said notch in said cam portion to allow said gear means to rotate and move along said rack when said seat assembly is pushed forwardly from its adjusted position, said back rest when moved toward its upright position causing said first spring means to move said tab of said lock lever into engagement with said annular cam portion of said gear means and when moved rearwardly causing said gear means to rotate and move along said rack while said tab rides on said cam portion until said notch in said cam portion is radially aligned with said tab on said lock lever whereupon said first spring means moves said lock lever to its locked position and with the tab being received within said notch to prevent further rearward movement of said seat cushion unit whereby the latter is automatically returned to it previous adjusted position.

* * * * *